June 16, 1931. H. C. LORD 1,810,717
CUSHION MOUNTING
Original Filed Feb. 11, 1927
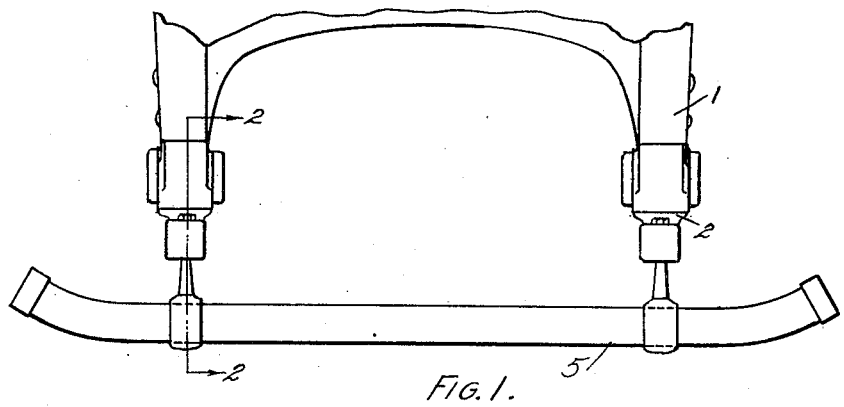
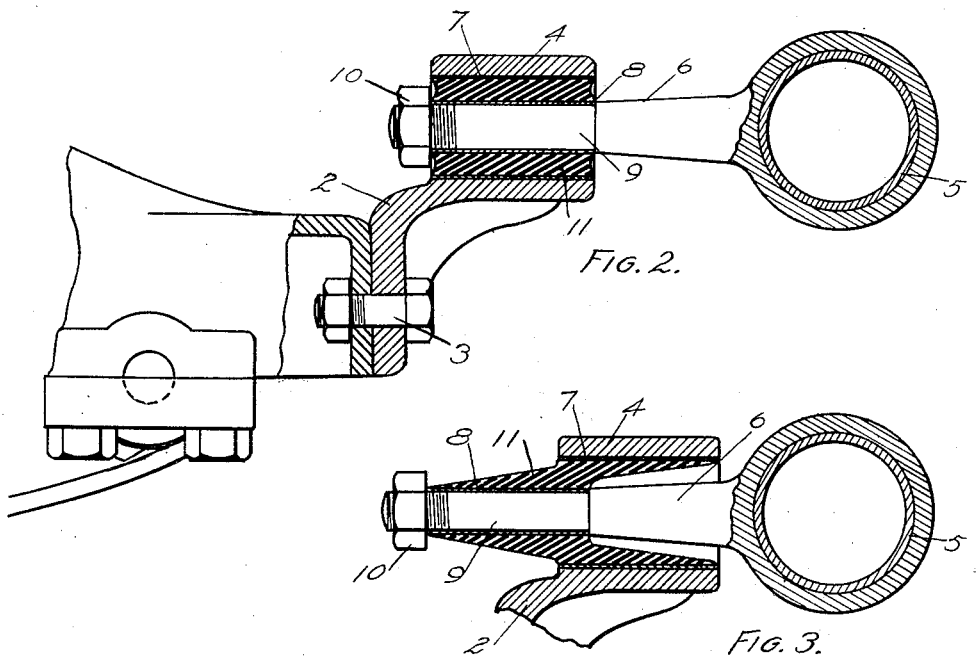
INVENTOR.
Hugh C. Lord Patented June 16, 1931

1,810,717

UNITED STATES PATENT OFFICE

HUGH C. LORD, OF ERIE, PENNSYLVANIA

CUSHION MOUNTING

Application filed February 11, 1927, Serial No. 167,432. Renewed October 21, 1929.

The invention is designed to utilize rubber as a cushion for a mounting requiring a considerable yielding movement in cushioning the parts. The invention is peculiarly advantageous as a bumper mounting for automobiles and is so exemplified in the present application.

A preferred embodiment of the invention is illustrated in the accompanying drawings as follows:—

Fig. 1 shows a plan view of a bumper and front end of an automobile frame.

Fig. 2 a side elevation of an automobile frame, the bumper support being partly in section on the line 2—2 in Fig. 1.

Fig. 3 a similar view of the support under strain.

1 marks the frame of the automobile. A bumper support 2 is secured to the front of the frame by a bolt 3. This support has a tubular wall 4. A bumper 5 may be of any form and is provided with a projection 6 which is adapted to telescope the tubular wall 4. A cushion unit comprises a steel shell 7 which is secured in the tubular wall and a hollow pin 8 which is secured on the reduced portion 9 of the projection 6 and clamped on the projection by a nut 10. Rubber 11 is secured to the inner wall of the shell 7 and the outer wall of the hollow pin 8, preferably by bonding which is accomplished during vulcanization. This manner of bonding places the rubber under initial radial tension and thus improves its ability to prevent the transmission of noise. The rubber mounting holds the bumper and insulates it against ordinary vibration and shocks from the frame and forms a noiseless and convenient connection. When the bumper is subjected to strain the rubber is forced to the rear, as shown in Fig. 3, thus cushioning the blow. This cushion may be of sufficient extent to obviate the necessity for other yielding means between the support and the bumper.

What I claim as new is:—

1. In a mounting, the combination with a supporting member and a supported member, one having a tubular wall and the other a projection adapted to telescope the wall, a rubber bushing between and locked with the projection and the wall.

2. In a mounting, the combination with a supporting member and a supported member, one having a tubular wall and the other a projection adapted to telescope the wall, a rubber bushing between and locked with the projection and the wall, the engaging faces of the rubber being secured by surface bonding.

3. In a mounting, the combination with a supporting member and a supported member, one having a tubular wall and the other a projection adapted to telescope the wall, a resilient element comprising an outer metallic shell, a central pin, said pin supplementing the projection, and a rubber bushing between the shell and the pin.

4. In a mounting, the combination with a supporting member and a supported member, one having a tubular wall and the other a projection adapted to telescope the wall, a resilient element comprising an outer metallic shell, a central pin, said pin supplementing the projection, and a rubber bushing between the shell and the pin and locked therewith by a surface union between the rubber and the inner and outer surfaces of the shell and pin respectively.

5. In a bumper mounting, the combination of an automobile frame; a bumper supporting member on the frame; a bumper member supported by the supporting member, one of the members having a projection extending longitudinally of the frame and the other of the members having walls arranged at opposite sides of the projection, said projection being movable through the space between the walls lengthwise of the frame; and rubber extending from the projection to the walls and having engaged surfaces locked with the projection and the walls, said rubber supporting the bumper and cushioning the same as it is distorted by a relative movement of the locked surfaces in a direction lengthwise of the frame.

6. In a bumper mounting, the combination of an automobile frame; a bumper supporting member on the frame; a bumper member supported on the supporting member, one of said members having a tubular wall and the other a projection telescoping the wall; and a bushing between the projection and the wall.

7. In a bumper mounting, the combination of an automobile frame; a bumper supporting member on the frame; a bumper member supported on the supporting member, one of the members having a tubular wall and the other a projection telescoping the wall; and a rubber bushing between the projection and the wall secured to the projection and the wall, the engaging surfaces of the rubber being secured by a surface union.

8. In a bumper mounting, the combination of an automobile frame; a bumper supporting member on the frame; a bumper member supported on the supporting member, one of the members having a tubular wall and the other a projection telescoping the wall in a direction lengthwise of the frame; and a bushing between the projection and the wall.

9. In a bumper mounting, the combination of an automobile frame; a bumper supporting member on the frame; a bumper member supported on the supporting member, one of the members having a tubular wall and the other a projection telescoping the wall in a direction lengthwise of the frame; and a rubber bushing between and locked with the projection and the wall, the engaging surfaces of the rubber being secured by a surface union.

10. In a bumper mounting, the combination of an automobile frame; a bumper supporting member secured to the frame having a tubular wall; a bumper having a projection extending lengthwise of the frame and telescoping the wall; and a rubber element having an outer shell, an inner sleeve, said rubber element being bonded to the outer shell and the sleeve, said projection extending through said sleeve.

11. In a bumper mounting, the combination of an automobile frame; a bumper supporting member on the frame; a bumper member supported by the supporting member, one of the members having a projection extending longitudinally of the frame and the other of the members having a wall arranged opposite the longitudinal face of the projection, said projection, being movable relatively to said wall; and rubber extending between the projection and the wall and having engaged surfaces locked with the projection and the wall, said projection supporting the bumper and cushioning the same as it is distorted by a relative movement of the engaged surfaces in a direction lengthwise of the frame.

12. In a bumper mounting, the combination of an automobile frame; a bumper supporting member on the frame; a bumper member supported by the supporting member, one of the members having a projection extending longitudinally of the frame and the other of the members having a wall arranged opposite the longitudinal face of the projection, said projection being movable relatively to said wall; and rubber extending between the projection and the wall and locked with the projection and the wall, the engaging surfaces of the rubber being secured by surface bonding, said projection supporting the bumper and cushioning the same in a relative direction lengthwise of the frame.

In testimony whereof I have hereunto set my hand.

H. C. LORD.